United States Patent [19]

Brac

[11] Patent Number: 4,845,686
[45] Date of Patent: Jul. 4, 1989

[54] METHOD AND DEVICE FOR DETERMINING THE POSITION OF IMMERSED OBJECTS WITH RESPECT TO THE SHIP WHICH TOWS THEM

[75] Inventor: Jean Brac, Saujon, France

[73] Assignee: Institut Francais du Petrole, Rueil-Malmaison, France

[21] Appl. No.: 112,942

[22] Filed: Oct. 27, 1987

[30] Foreign Application Priority Data

Oct. 31, 1986 [FR] France .................................. 86 15309

[51] Int. Cl.$^4$ .............................................. G01V 1/38
[52] U.S. Cl. ........................................ 367/130; 367/19
[58] Field of Search ................. 367/106, 130, 19, 2, 367/6, 16–18, 20; 114/242

[56] References Cited

U.S. PATENT DOCUMENTS 4,376,301 3/1983 Roberts ............................... 367/130
4,709,356 11/1987 Ayers .................................. 367/130

FOREIGN PATENT DOCUMENTS

WO8403153 of 0000 PCT Int'l Appl. .
2113391 8/1983 United Kingdom .

*Primary Examiner*—Thomas H. Tarcza
*Assistant Examiner*—Daniel T. Pihulic
*Attorney, Agent, or Firm*—Antonelli, Terry & Wands

[57] ABSTRACT

A method and device are provided for determining by acoustic telemetering the position of immersed objects with respect to a ship having a location assembly connected thereto including two acoustic transmission-reception assemblies and a towed locating base including two other assemblies offset laterally with respect to the path of the ship, in which method two measuring cycles are carried out successively, the first one consisting in determining by acoustic telemetering the position of the mobile locating base with respect to the locating base fixed to the ship, while the second consists, still using acoustic telemetering, in determining the position of the towed objects with respect to the mobile locating base. Then the coordinates of all the towed objects are determined with respect to the ship.

10 Claims, 5 Drawing Sheets

METHOD AND DEVICE FOR DETERMINING THE POSITION OF IMMERSED OBJECTS WITH RESPECT TO THE SHIP WHICH TOWS THEM

BACKGROUND OF THE INVENTION

1. Field of the Invention

The invention relates to a method and device for determining the position of immersed objects with respect to a ship which is towing them.

More particularly, the invention relates to a method and device for determining the position of elements of a seismic transmission and reception device towed immersed by a ship, with respect to several locations whose position with respect to a ship is determined.

2. Description of the Prior Art

An acoustic telemetric method is known for determining the position of an object or a vehicle towed while immersed by a ship which consists in immersing transponders at well defined locations in the scheduled zone of evolution and in measuring, by acoustic telemetering, the distances between the towing ship, the transponders and the vehicle. The position of the towed object or vehicle with respect to the ship is calculated by triangulation. Such a method is described in the U.S. Pat. No. 4,229,809.

The accuracy which can be reached is good because the spacing between the transponders is of the same order of size as the distances to be measured.

Its use is however difficult because the zone of evolution must be marked out with beacons prior to immersion of the transponders.

This is an appreciable disadvantage especially when the marking out must be done specially for a particular application and the zone to be marked out is very extensive, as is the case particularly in seismic sea prospection.

Another known method of determining the position in the water of a towed object, in this case that of different points of a seismic streamer with respect to the towing vehicle, is described in the U.S. Pat. No. 4,376,301.

In this method, the distance is determined by acoustic telemetering between two acoustic pulse sources fixed to the ship and whose positions are accurately known and each hydrophone of a plurality of hydrophones spaced apart along the streamer.

The French patent application No. 2,545,226 also describes a method for determining the position in the water of a seismic streamer towed while immersed, consisting essentially in measuring the distances to the ship of a plurality of points spaced apart along the streamer and the azimuth of these points, by means of a gyro compass and a very short based hydro-acoustic system.

For essentially practical reasons, the spacing between the reference points where the acoustic transducers of the acoustic telemetering system are fixed with respect to the ship, is often very small with respect to the length of the towed objects, whether it is a question of a multisource transmitting device or a seismic streamer.

The distance between the reference points is in the range between a few tens of centimeters and a few meters whereas the streamer sometimes extends over several kilometers. The triangle formed by the reference points of the base and each point of the seismic streamer is disproportional, which adversely affects the accuracy of the telemetric measurements or of angular measurements made from the ship.

From the French application No. 2,533,706, a method is known of localizing an objet towed while immersed with respect to a towing ship. Parallel thereto and set back therefrom moves an independent auxiliary ship. The position of the two ships with respect to each other is measured by a conventional radio-navigational system and by triangulation by means of immersed acoustic transponders.

The position of the towed object (in this case a seismic streamer) is determined by triangulation by means of an acoustic telemetering system including a transmitter-receiver under the main ship, an acoustic receiver under the auxiliary ship and acoustic transponders spaced apart along the towed object.

The use of this method requires then the use of two independent ships each having a radio-navigational positioning system and a radio transmission assembly for transmitting to the main ship the signals indicative of the arrival times of the acoustic responses reaching the secondary ship. Furthermore, the acoustic transmitters and receivers associated with the ship are immersed at a relatively low depth and it can be seen that that may make the detection of acoustic signals difficult because of the disturbance of the water in its surface layers particularly in the wake.

From the patent application No. WO 84/03153, a location system is known for determining the position in the water of a seismic streamer with respect to a ship which is towing it. This system includes more particularly acoustic transponders fixed to towed paravanes which are offset laterally with respect to the counter of the ship. The position of the seismic streamer is in this case determined by acoustic telemetering with respect to these transponders.

SUMMARY OF THE INVENTION

The method of the invention allows the position of immersed objects to be determined associated with acoustic wave reception means and towed while immersed by a ship relatively to a location assembly connected to the ship which includes a mobile location base having at least one acoustic wave transmission-reception assembly towed while immersed and offset laterally with respect to the path of the ship, by measuring the propagation times of these waves over paths between the locating assembly and said objects, the method of the invention overcoming the drawbacks of prior methods.

This method is remarkable in that:

the locating assembly further includes a locating base fixed to the ship and having at least two acoustic wave transmission-reception assemblies and in that, a first acoustic telemetering cycle is carried out for measuring the position of the mobile locating base with respect to the locating base fixed to the ship, at least a second acoustic telemetering cycle is carried out for measuring the position of the reception means associated with the towed objects with respect to the mobile locating base and in that:

the position of the towed objects is determined with respect to the ship.

With a single ship, and appropriate transverse deflection and towing means, a long locating base may be formed and, by acoustic telemetering, the position in the water of towed objects can be obtained. The accuracy of the measurements obtained is particularly good because:

the lateral spacing which separates the towed transmission-reception assemblies is great, the use of deflection means immersable at a relatively great depth overcomes the disturbances which affect the propagation of the acoustic signals and which are due to the movements of the water and to the eddies in the wake of the ship, and also, what is essential, because the position of the towed acoustic transmission-reception assemblies forming the mobile locating base is determined regularily with respect to a locating base fixed with respect to the ship so as to take into account the fluctuations which may occur under towing conditions. The measuring means integrate at all times the results of two telemetered measuring steps, one concerning the positioning of the towed assemblies with respect to the ship, the other the positioning of the objects with respect to the same assemblies, the two steps being able to be carried out alternately.

BRIEF DESCRIPTION OF THE DRAWINGS

Other advantages of the method and features of the device for implementing same will be clear from reading the following description of embodiments given by way of non limitative examples, with reference to the accompanying drawings in which.

DESCRIPTION OF THE PREFERRED EMBODIMENTS

Figure 1:
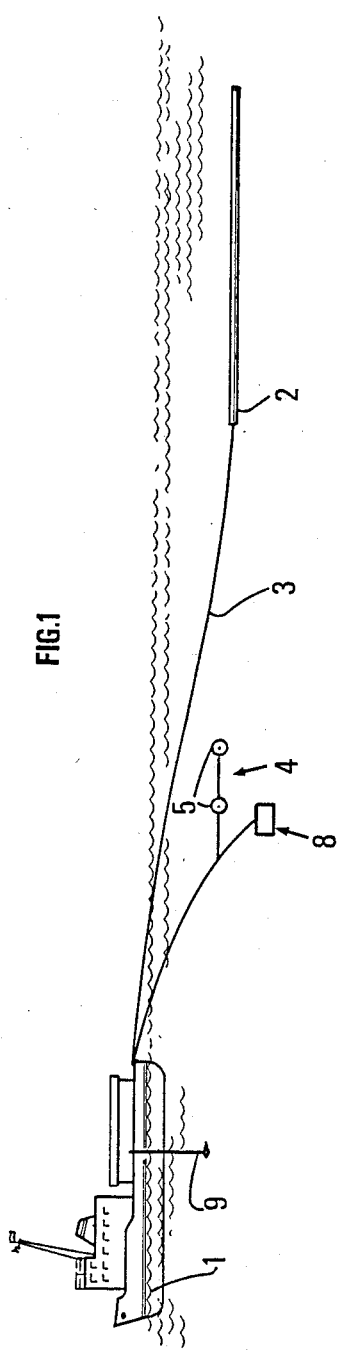
FIG. 1 shows a ship towing behind it a transmission device and a seismic streamer and having acoustic transmission-reception assemblies.

The method of the invention may serve for example for determining the positioning with respect to a ship 1 (FIGS. 1, 2) of a seismic transmission-reception system including a seismic streamer 2 towed at the end of traction cables 3 and a transmission device 4 formed of one or more acoustic pulse sources 5 ($S_1$, $S_2$, $S_3$, $S_4$ etc).

The sources 5 are connected to the ship by multifunction cable assemblies or "umbilicals" 6. these cables, or some of them, are fixed to other cables 7 connecting the ship to deflection apparatus 8 adapted, when they are towed, for moving laterally aside from the route followed.

They may be paravanes, panels or platforms such as those described in French Pat. Nos. 2,296,562 or 2,253,542. Generally two deflection apparatus are used adapted for moving apart symmetrically with respect to the path of the ship.

The method of the invention includes the immersion in a fixed position with respect to the ship of two acoustic transmission-reception assemblies $ER_1$, $ER_2$. These assemblies each include a transmitter-receiver transducer housed in the lower part of a long immersible rod 9 which, in operation, is fixed in the vertical position to the hull of the ship.

It is preferable to use the rods described in the French patent application No. EN 86/09321. Each transducer is connected by lines running along the rods 9 and over the ship to a transmission-reception device 10 (FIG. 2) which will be described further on.

To the two deflection apparatus 8 are respectively fixed two acoustic transmission-reception assemblies $ER_3$ and $ER_4$. For example, independent transmitter-receivers may be used of the "transponder" type adapted, on reception of an acoustic signal, to retransmit a signal at a characteristic frequency.

It is preferable to use an acoustic transducer connected to a transmitter-receiver. This latter is fed electrically and connected to the control device 10 by a multiconductor cable attached to the corresponding towing cable 7 (not shown).

The apparatus and particularly the seismic sources $S_1$, $S_2$ etc, whose position with respect to the ship it is a question of determining, are provided with acoustic receivers. Thereagain, and depending on the cases, it may be a question of transducers associated with reception circuits and connected by transmission and power supply lines to the control device or else independent transducers retransmitting acoustically in response to the acoustic signals which they receive. For marine seismic sources, one or other case may be used.

The transmission and supply lines, if they are used, are included in the multifunction connection assembly 6 connecting each seismic source to the ship.

If the process is used for determining the position of the seismic streamer, transponders may be used fixed externally thereto at a point or a plurality of separate points.

Sensors $CF_1$, $CF_2$ ... $CF_j$ ... $CF_n$ may also be integrated in a seismic streamer, these sensors being connected to the recording laboratory on the ship either by one or more special lines, or else via seismic acquisition apparatus inserted between different sections of a so called multiplexing seismic streamer, such as the one described in French Pat. No. 2 511 772.

The method of the invention includes a first acoustic telemetering cycle for determining the mobile base formed by the assemblies $ER_3$, $ER_4$. Successively, the following operations are carried out:

transmission by the first transmission-reception assembly $ER_1$ fixed to the ship of an acoustic pulse at a frequency $f_1$, which is received after propagation in the water by the second assembly $ER_2$ fixed to the ship and by the offset transmissionreception assemblies $ER_3$, $ER_4$ of the towed mobile base, and transmission by the other assembly $ER_2$ of an acoustic pulse at a frequency $f_2$ which is received by the first assembly $ER_1$ and by the offset assemblies $ER_3$, $ER_4$ of the towed base.

By combining the results of these two series of telemeasurements, the distances $L_{12}$ and $L_{21}$ between the first two transmission-reception assemblies $ER_1$ and $ER_2$ and the distances $L_{13}$, $L_{23}$, $L_{14}$ and $L_{24}$ separating these latter from the offset assemblies $ER_3$, $ER_4$ may be derived.

From these first results, the spacing apart of the two fixed assemblies $ER_1$, $ER_2$, is checked and the coordinates of the towed base ($ER_3$, $ER_4$) connected to the deflection means are determined.

Figure 2:
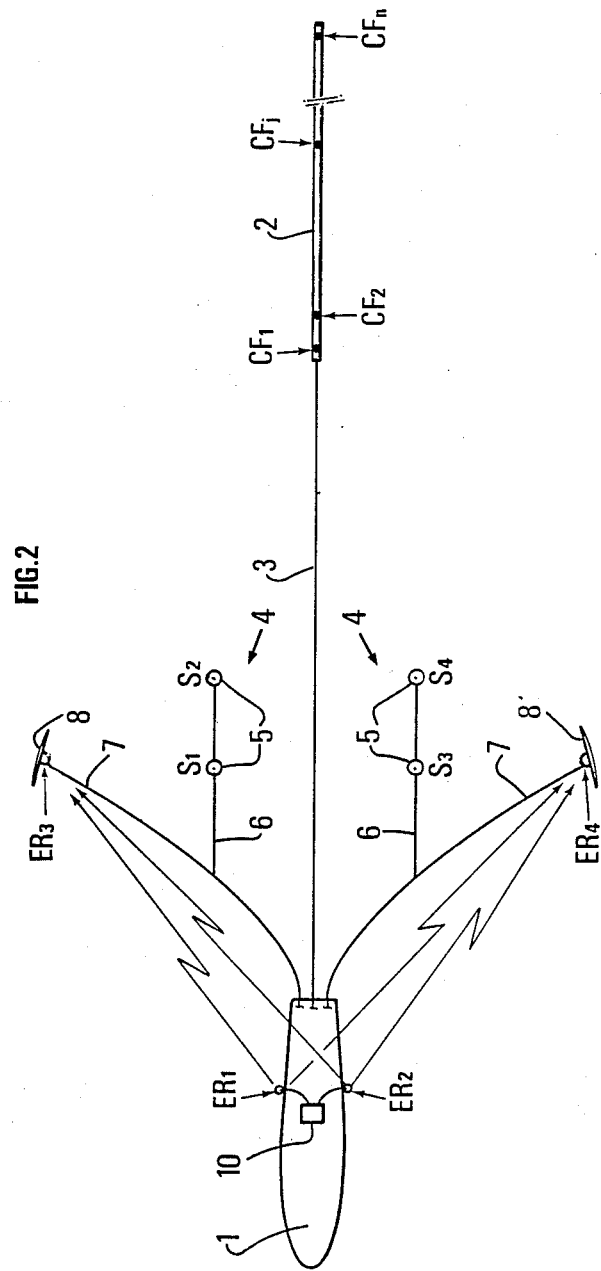
FIG. 2 shows in a top view a ship with acoustic transmission-reception assemblies disposed symmetrically on each side of the path of the ship, which form the two locating bases.
Figure 3:
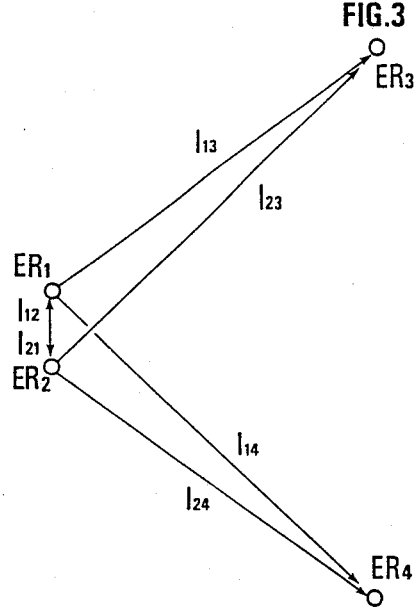
FIG. 3 shows different paths measured between the transmission-reception assemblies of the locating base fixed to the ship and the mobile locating base.
Figure 4:
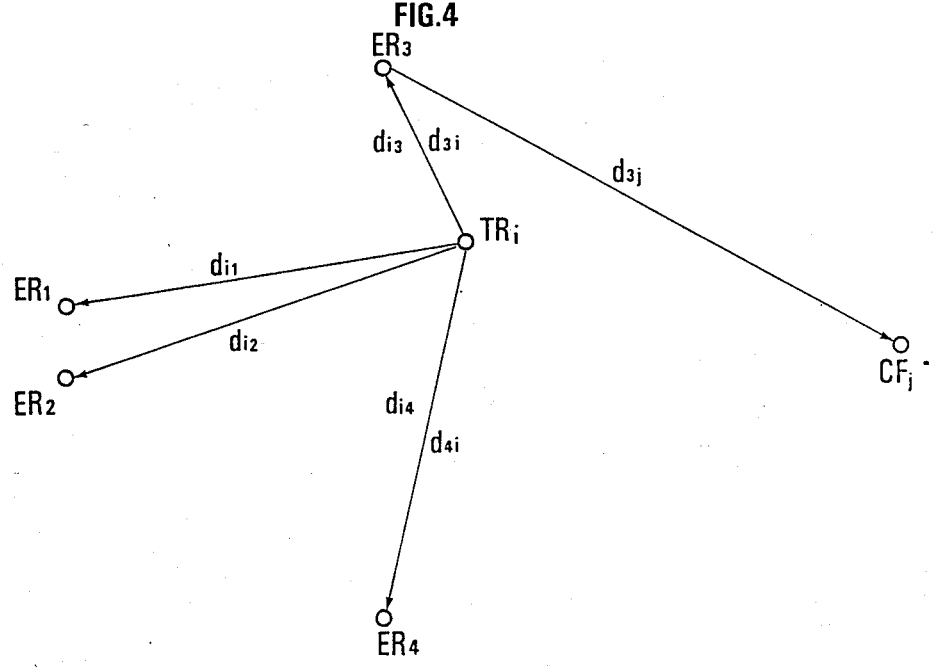
FIG. 4 shows different paths measured between the towed objects and the transmission-reception assemblies of the two locating bases.

Then a second acoustic telemetering cycle is carried out for positioning the towed objects with respect to the mobile base ($ER_3$, $ER_4$). For this, and in the case where the transponders are associated with the objects, the following operations are carried out successively:

transmission by $ER_3$ of a pulse at frequency $f_0$ (FIG. 4) which is received by the transponders $TR_i$ associated with the towed objects $S_i$ in the case shown in FIG. 2, (the number i is equal to 1, 2, 3 or 4) and by the specialized receivers $CF_j$ of the seismic streamer (hereagain, the number j is for example equal to 1 or 2). On reception of the pulse signal the transponders each retransmit at their own frequency $FR_i$ ($TR_1$, $TR_2$, $TR_3$, $TR_4$ respond respectively to the frequencies $FR_1$, $FR_2$, $FR_3$, $FR_4$). The retransmitted signals are picked up by the four transmission-reception assemblies $ER_1$, $ER_2$, $ER_3$ and $ER_4$ and transmitted to the central system 10 on the ship. Similarly, signals picked up by the specialized receivers $CF_j$ of the streamer are transmitted to the same central system over the transmission lines inside the seismic streamer. For each transponder $TR_i$, the propagation distances $(d_{3,i}+d_{i,3})$, $(d_{3,i}+d_{i,1})$, $(d_{3,i}+d_{i,2})$ and $(d_{4,i}+d_{i,4})$ can be determined (FIG. 4). A distance $d_{3,j}$ may also be associated with the specialized receiver $CF_j$.

the same operation is repeated from $ER_4$ so as to associate, with each transponder $R_i$ and with each receiver $CF_j$ of the streamer, the following measurements: $(d_{4,i}+d_{i,4})$, $(d_{4,i}+d_{i,1})$, $(d_{4,i}+d_{i,2})$ and $(d_{4,i}+d_{i,3})$ on the one hand and $d_{4,j}$ on the other (FIG. 4).

Knowing the paths between the transmission-reception assemblies and the different towed objects, their respective coordinates with respect to the ship may then be determined.

Figure 5:
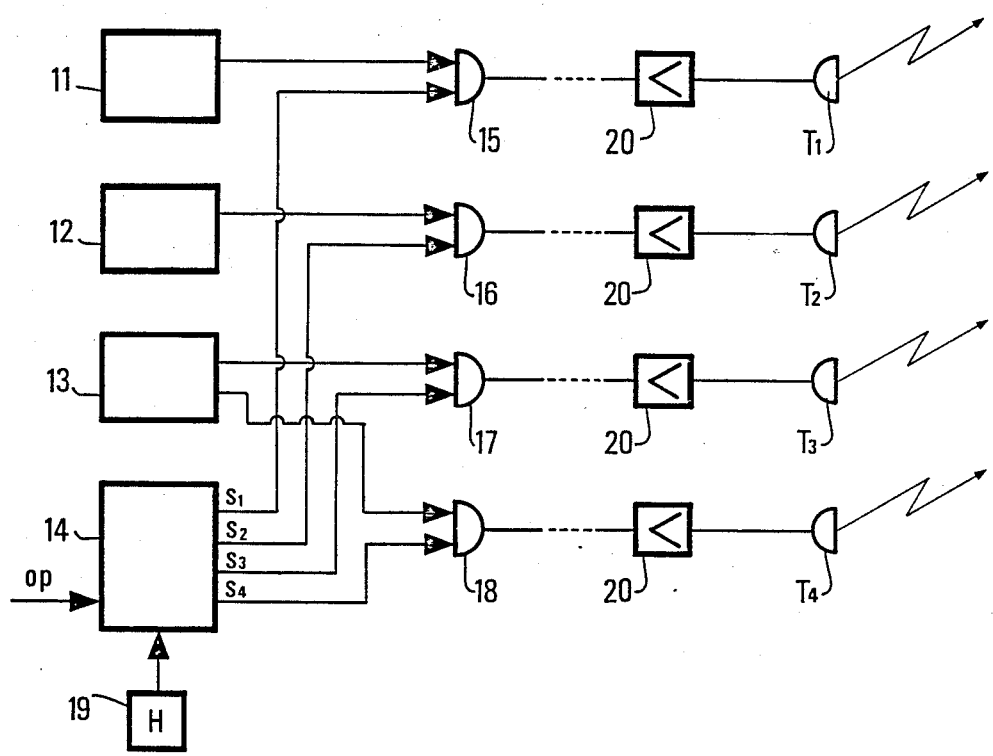
FIG. 5 shows a block diagram of the control assembly for generating the acoustic pulses transmitted.

The implementation device includes first of all a control assembly for generating in sequence the different transmission signals, formed (FIG. 5) of three signal generators 11, 12, 13 producing signals at respective frequencies $f_0$, $f_1$ and $f_2$, a sequencer 14 and four AND gates 15, 16, 17 and 18. The sequencer 14 includes a programmable counter connected to a clock element 19. At its four outputs $s_1$, $s_2$, $s_3$, $s_4$ connected to the control inputs of gates 15 to 18, the sequencer delivers four pulses offset in time.

Gates 15 and 16 control respectively the application of pulses of frequencies $f_1$ and $f_2$ to transducers $T_1$ and $T_2$ of the transmission-reception assemblies $ER_1$ and $ER_2$ via power amplifiers 20. Similarly, gates 17 and 18 control respectively the application of pulses of frequency $f_0$ successively to the transducers $T_3$, $T_4$ of the transmission-reception assemblies $ER_3$ and $ER_4$ of the towed base via amplification stages 20.

The implementation device also includes a reception and telemetering system. The acoustic signals received by the transducers $T_3$ and $T_4$ of the transmission-reception assemblies of the towed base ($ER_3$, $ER_4$) are applied (FIG. 6) to preamplifiers 21 then transmitted respectively to telemetering assemblies $E_3$, $E_4$.

Figure 7:
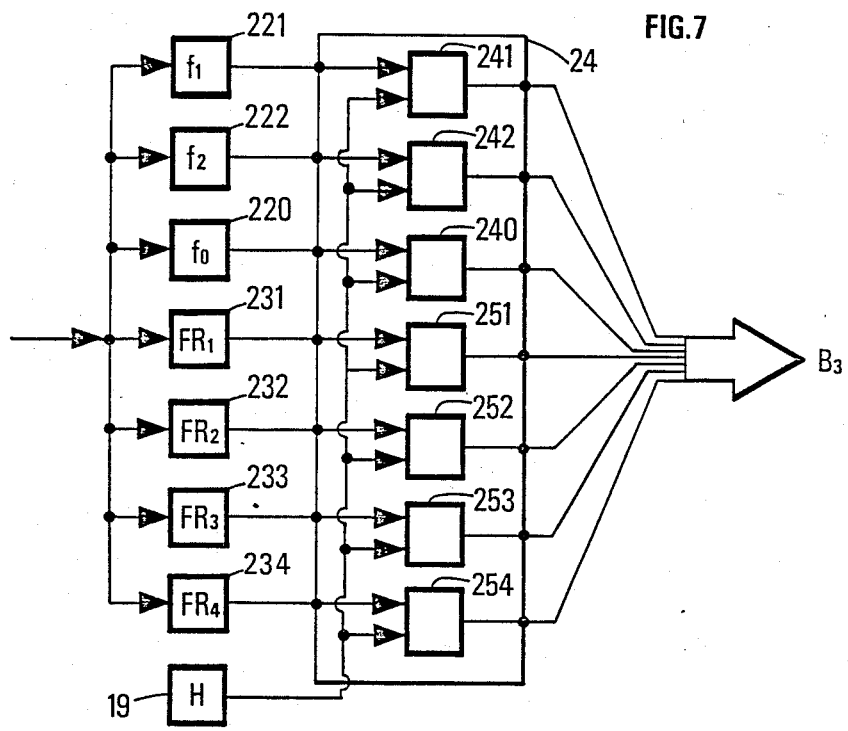
FIG. 7 shows a block diagram of a telemetering assembly associated with each acoustic transmission and reception assembly.

Each of them (FIG. 7) includes three narrow pass band filters 220, 221, 222 for separating the signals of the fixed transmission-reception assemblies $ER_1$, $ER_2$ and of the other assembly ER of the mobile locating base ($ER_4$ when $ER_3$ has transmitted and reciprocally). It also includes as many narrow band filters as there are towed transponders $TR_i$ (four filters 231, 232, 233, 234 in the example of application described).

These filters are adapted for separating the signals of frequency $FR_1$, $FR_2$, $FR_3$, $FR_4$ coming respectively from the transponders $TR_1$, $TR_2$, $TR_3$, $TR_4$. The signals from the filters are applied respectively to counters 240, 241, 242 on the one hand and 250 to 254 on the other, of counting assembly 24. These counters, which are connected to the clock element (H) 19, measure the propagation times of the signals transmitted at the different frequencies. The measured values coming from the counting units of assemblies $E_3$, $E_4$ (FIG. 6) are applied respectively to two inputs $B_3$, $B_4$ of a storage member 26.

The acoustic signals picked up by the transducers of the seismic streamer $CF_1 \ldots CF_j \ldots CF_n$ are applied to preamplifiers 21 then to elements $27_1$, $27_j \ldots 27_n$ for staggering their respective frequencies by an amount characteristic of each transducer.

Element $27_1$ applies a frequency shift $df_1$, element 27, a shift $df_j$, etc. The outputs of all the staggering elements $27_1 \ldots 27_j \ldots 27_n$ are connected to a common line 28 running along the seismic streamer and connected to the reception and telemetering system of the ship.

Line 28 is connected to as many telemetering assemblies $EF_1 \ldots EF_j \ldots EF_i$ as there are transducers $CF_1, CF_2 \ldots CF_j \ldots CF_n$ spaced apart in the streamer.

Figure 8:
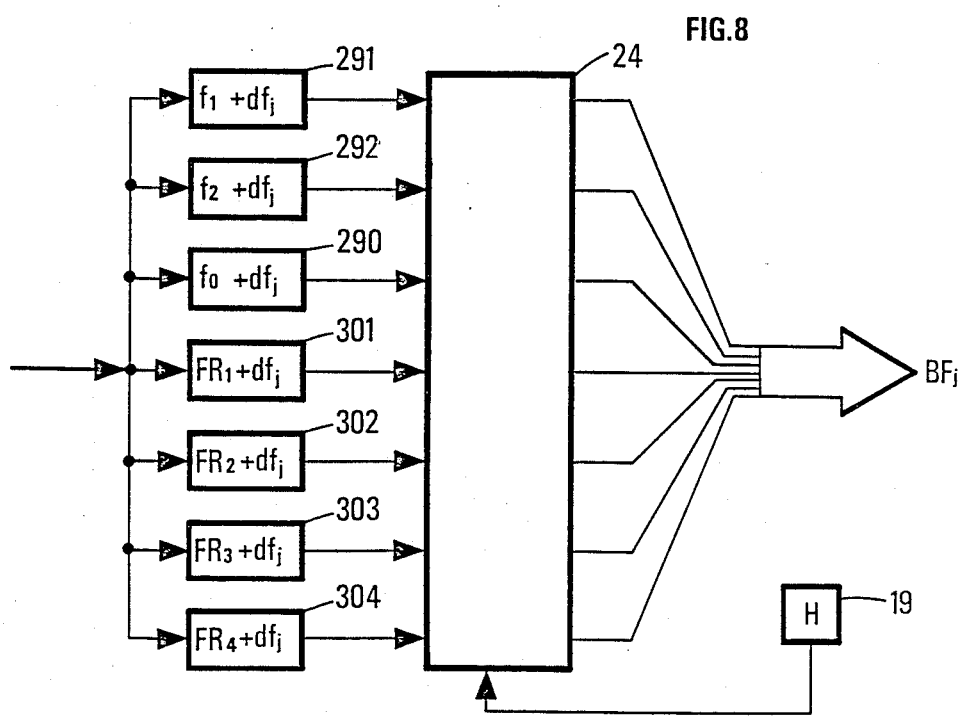
FIG. 8 shows a block digram of the telemetering assemblies associated with the different receivers of a seismic streamer.

Each of these assemblies $EF_1 \ldots EF_j \ldots EF_n$ includes (FIG. 8) as many narrow pass band filters as the assemblies $E_3$ and $E_4$ (in the case in point seven, 291, 292, 293 and 301 to 304). But their respective central frequencies are staggered by the same amount so as to separate from the others the signals coming from the corresponding transducer (the shifts $df_1 \ldots df_j \ldots df_n$ correspond for example to the transducers $CF_1 \ldots CF_j \ldots CF_n$) and similarly to isolate the acoustic signals coming from the different transmitter-receivers $ER_1$ to $ER_4$ and from the different transponders. Similarly, the signals from the filters are applied to a counting assembly 24.

Figure 6:
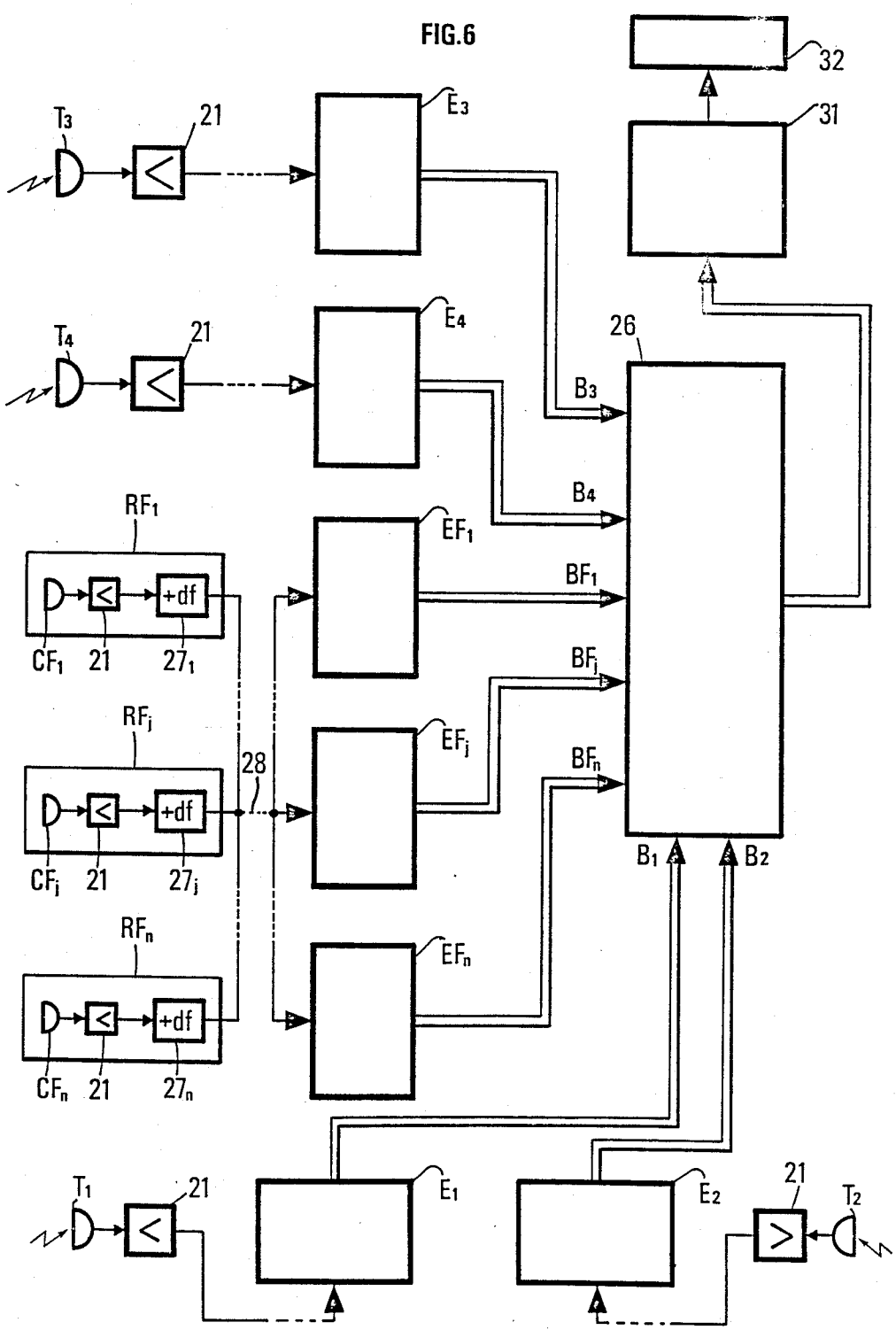
FIG. 6 shows a block diagram of a reception and telemetering system which determines the relative position of the different towed objects with respect to the fixed base and the mobile base.

The measured values delivered by the counters of assemblies $EF_1 \ldots EF_j \ldots EF_n$ are applied respectively to inputs $BF_1 \ldots BF_j \ldots BF_n$ of the storage member 26 (FIG. 6).

This latter is connected to a processor 31 which determines, from the different values stored during the two acoustic telemetering cycles, the position of the transmitter-receiver assemblies $ER_3$, $ER_4$ of the mobile base with respect to the ship, the position of the towed objects with respect to the mobile base and so their position with respect to the ship. The results of the calculations are then displayed on a display console 32.

The reception and telemetering system also includes two telemetering units $E_1, E_2 \ldots$ connected respectively to the transducers $T_1$ n $T_2$ of the fixed locating base $ER_1, ER_2$ (also via preamplifiers 21). Assemblies $E_1$ and $E_2$ are similar to the previously described assemblies $E_3$ and $E_4$ and the values measured by the respective counting assemblies are applied to two inputs $B_1, B_2$ of the storage member 26.

What is claimed is

1. A method for determining positions with respect to a ship of immersed objects associated with acoustic wave reception means and towed while immersed by said ship comprising:

(a) disposing a reference locating base in fixed relationship with respect to the ship, said reference locating base being provided with at least two acoustic wave transmission-reception assemblies at a distance from each other;

(b) immersing a mobile locating base towed by the ship and provided with at least one acoustic wave transmission-reception assembly laterally offset with respect to the ship route such that the lateral distance between the ship and said assembly is larger than the distance between said assemblies;

(c) measuring the position of said mobile locating base with respect to said reference locating base by a first acoustic telemetering cycle;

(d) measuring the position of said reception means associated with the towed objects with respect to said mobile locating base by at least one second acoustic telemetering cycle; and (e) combining results of said first and said second telemetering cycles to determine the position of the towed objects with respect to the ship.

2. A device for determining positions of immersed objects along a path with respect to a ship towing said objects comprising:

acoustic receivers connected to said objects;

a mobile locating base having at least one acoustic wave transmission-reception assembly associated with shifting means towed by the ship for moving said base laterally aside with respect to the path of the ship;

a reference locating base fixed to the ship, including acoustic wave transmission-reception assemblies separated by a distance from each other;

a control assembly connected to the transmission-reception assemblies for generating pulsed signals at two different frequencies and applying said signals to each transmission-reception assembly of the mobile locating base; and a telemetering and reception system connected to the transmission-reception assemblies and to each acoustic receiver, for determining the respective positions of each transmission-reception assembly of the mobile locating base with respect to the assemblies of the locating base fixed to the ship and the position of each receiver with respect to the transmission-reception assemblies of the mobile locating base.

3. The device as claimed in claim 2, wherein each acoustic receiver is associated with a transponder having a given fixed retransmission frequency.

4. The device as claimed in claim 2, wherein the towed means for moving each transmission-reception assembly aside include an immersible panel connected to the ship by traction means and at least one cable for the electric power supply of the associated transmission-reception assembly and for the transmission of signals between it, the control assembly and the reception and telemetering systems.

5. The device as claimed in claim 3, wherein the control assembly includes generators generating signals of different frequencies whose outputs are connected respectively to the transmission-reception assemblies of the locating base fixed to the ship via gates and a generator generating signals at a third frequency whose output is connected to the transmission-reception assemblies of the mobile locating base via other gates and programmable counting means connected to a clock element for generating pulsed signals and applying them to the control inputs of the gates.

6. The device as claimed in claim 3, wherein the reception and telemetering system includes a plurality of telemetering assemblies each having a plurality of filtering means for separating said signals received by the transmission-reception assemblies as a function of the respective frequencies and counting elements for measuring the propagation times of said signals, the reception and telemetering system also including a member for storing the measured values and computing means for determining the relative position of the towed objects with respect to the transmission-reception assemblies of the two locating bases.

7. The device as claimed in claim 6, wherein each acoustic receiver fixed to each towed object is associated with a transponder retransmitting at a particular frequency, each telemetering assembly including filtering means adapted to the particular retransmission frequencies of the transponders.

8. The device as claimed in claim 6, wherein one of the towed objects is a seismic streamer having at least one acoustic receiver connected by a transmission line to a telemetering assembly including a plurality of filtering means and counting means for measuring the propagation times of the signals transmitted from the different transmission-reception assemblies.

9. The device as claimed in claim 8, wherein the telemetering assembly connected to each acoustic receiver of the streamer includes filtering means adapted for separating the acoustic signals coming from the different transponders.

10. The device as claimed in claim 8, wherein the seismic streamer includes a plurality of acoustic receivers connected in parallel across the transmission line, each of them having a means for staggering the frequency of the signals which it receives by a characteristic amount and the reception and telemetering system includes a plurality of telemetering assemblies associated respectively with the different acoustic receivers of the streamer, each of them including filters whose frequencies are staggered by the same characteristic amount, so as to separate the acoustic signals coming from the different transmission-reception assemblies and from the transponders associated with the towed objects.

* * * * *